(12) United States Patent
Ben Salah

(10) Patent No.: US 12,278,388 B2
(45) Date of Patent: Apr. 15, 2025

(54) STORAGE MODULE HAVING A DEGASSING LINE

(71) Applicant: Bayerische Motoren Werke Aktiengesellschaft, Munich (DE)

(72) Inventor: Semi Ben Salah, Finsing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 540 days.

(21) Appl. No.: 17/613,246

(22) PCT Filed: Apr. 28, 2020

(86) PCT No.: PCT/EP2020/061662
§ 371 (c)(1),
(2) Date: Nov. 22, 2021

(87) PCT Pub. No.: WO2020/239343
PCT Pub. Date: Dec. 3, 2020

(65) Prior Publication Data
US 2022/0223969 A1 Jul. 14, 2022

(30) Foreign Application Priority Data
May 27, 2019 (DE) .................... 10 2019 114 047.1

(51) Int. Cl.
*H01M 50/317* (2021.01)
*H01M 10/613* (2014.01)
(Continued)

(52) U.S. Cl.
CPC ....... *H01M 50/317* (2021.01); *H01M 10/613* (2015.04); *H01M 10/625* (2015.04);
(Continued)

(58) Field of Classification Search
CPC ............ H01M 10/613; H01M 10/625; H01M 50/317; H01M 50/358; H01M 2220/20; H01M 2200/20
See application file for complete search history.

(56) References Cited

U.S. PATENT DOCUMENTS 5,643,691 A 7/1997 Iwatsuki et al.
11,482,756 B2 * 10/2022 Hayashi ................ H01M 50/30
(Continued)

FOREIGN PATENT DOCUMENTS

CN 101330160 A 12/2008
CN 101542776 A 9/2009
(Continued)

OTHER PUBLICATIONS

Chinese Office Action issued in Chinese application No. 202080022511.7 dated May 25, 2023, with English translation (Eighteen (18) pages).
(Continued)

*Primary Examiner* — Matthew J Merkling
(74) *Attorney, Agent, or Firm* — Crowell & Moring LLP

(57) ABSTRACT

A storage module for storing electrical energy includes an electrochemical storage cell, a housing which encloses the electrochemical storage cell, and a degassing line which is disposed on the housing and runs outside of the housing. An exhaust gas from an interior of the housing is dischargeable by the degassing line to an area surrounding the storage module and is coolable by the degassing line.

10 Claims, 1 Drawing Sheet

(51) Int. Cl.
*H01M 10/625* (2014.01)
*H01M 50/358* (2021.01)

(52) U.S. Cl.
CPC ...... *H01M 50/358* (2021.01); *H01M 2200/20* (2013.01); *H01M 2220/20* (2013.01)

(56) References Cited

U.S. PATENT DOCUMENTS

| | | |
|---|---|---|
| 2010/0255359 A1 | 10/2010 | Hirakawa et al. |
| 2011/0159326 A1* | 6/2011 | Oya .................. B60L 50/50 429/82 |
| 2012/0070703 A1 | 3/2012 | Wahl et al. |
| 2013/0337296 A1* | 12/2013 | Cardoso .............. B60L 1/003 429/61 |
| 2015/0236325 A1* | 8/2015 | Miller ............... H01M 50/463 429/50 |
| 2016/0014923 A1 | 1/2016 | Stevens et al. |
| 2016/0197323 A1* | 7/2016 | DeKeuster ......... H01M 50/147 429/82 |
| 2018/0047959 A1* | 2/2018 | Kruger ............. H01M 50/367 |
| 2018/0048038 A1* | 2/2018 | Mascianica ....... H01M 10/627 |
| 2018/0108891 A1* | 4/2018 | Fees ................. B60L 50/66 |
| 2019/0051951 A1* | 2/2019 | Yamanaka ........ H01M 10/6567 |
| 2019/0221803 A1* | 7/2019 | Moore .............. B65D 77/225 |

FOREIGN PATENT DOCUMENTS

| | | | |
|---|---|---|---|
| CN | 102369629 A | 3/2012 | |
| CN | 106058119 A | 10/2016 | |
| CN | 206541906 U | 10/2017 | |
| CN | 207558897 U | 6/2018 | |
| CN | 209312845 U | 8/2019 | |
| DE | 10 2008 034 700 A1 | 1/2010 | |
| DE | 10 2012 019 676 A1 | 4/2014 | |
| DE | 10 2013 204 585 A1 | 9/2014 | |
| DE | 10 2013 205 063 A1 | 9/2014 | |
| DE | 10 2014 212 173 A1 | 1/2016 | |
| FR | 2 949 390 A1 | 3/2011 | |
| GB | 2602554 A * | 7/2022 | ............... B60K 1/04 |
| JP | 7-245089 A | 9/1995 | |
| JP | 2005-339932 A | 12/2005 | |
| JP | 2013-39006 A | 2/2013 | |

OTHER PUBLICATIONS

PCT/EP2020/061662, International Search Report dated Aug. 13, 2020 (Two (2) pages).

German Search Report issued in German application No. 10 2019 114 047.1 dated Mar. 26, 2020, with Statement of Relevancy (Nine (9) pages).

* cited by examiner

STORAGE MODULE HAVING A DEGASSING LINE

BACKGROUND AND SUMMARY OF THE INVENTION

The invention relates to an electrical storage module, in particular for storing electrical energy for driving a motor vehicle.

An at least partially electrically driven vehicle, for example a BEV (Battery Electric Vehicle) or a PHEV (Plug-In Hybrid Electric Vehicle), typically has at least one storage module for storing the electrical energy for operating an electric drive motor of the vehicle. The storage module can have a fluid-tight housing in order to protect the one or more electrochemical storage cells embedded in the storage module against environmental influences.

A storage module having one or more electrochemical storage cells can have a degassing opening through which exhaust gases, which may be produced during operation of the storage module, can exit from the storage module to the area surrounding the storage module. Particularly when there is a defect or a short circuit in a storage cell of the storage module, a thermal reaction can take place in the affected storage cell, the thermal reaction producing the exhaust gases which lead to an increase in pressure in the housing of the storage module. As a result of the increase in pressure, a degassing valve and/or the degassing opening can open, so that relatively hot exhaust gases can escape from the housing of the storage module. The exhaust gases can comprise (in particular flammable) gases, such as CO, $CO_2$, ethene, $H_2$, HF etc. for example.

The present document is concerned with the technical problem of increasing the safety of a storage module when (relatively hot) exhaust gases are exiting from the storage module.

The problem is solved by the independent claim(s). Advantageous exemplary embodiments are described, inter alia, in the dependent claims. It should be noted that additional features of a patent claim that is dependent on an independent patent claim can, without the features of the independent patent claim or just in combination with a subset of the features of the independent patent claim, form a separate invention that is independent of the combination of all of the features of the independent patent claim and that can be turned into the subject matter of an independent claim, of a divisional application or of a subsequent application. This applies in the same way to technical teachings described in the description that are able to form an invention that is independent of the features of the independent patent claims.

A first aspect describes an (electrical) storage module for storing electrical energy. The storage module can have a rated voltage of 300 V or higher. As an alternative or in addition, the storage module can have a storage capacity of 5 kWh or more. In particular, the storage module can be designed as a high-voltage storage device. For example, the storage module can be designed to store electrical energy for driving a motor vehicle (for example a passenger car, a truck, a bus and/or a motorcycle).

The storage module comprises at least one electrochemical storage cell (for example a lithium ion-based storage cell). The storage cell can be a prismatic wound cell. The storage module typically comprises a large number of (structurally identical) storage cells which are DC-conductively connected to one another at least partially in series and/or at least partially in parallel, in particular in order to provide a storage module having the abovementioned rated voltage and/or having the abovementioned storage capacity.

Furthermore, the storage module comprises a housing which encloses the electrochemical storage cell. In this case, the housing is of fluid-tight design (in particular gas-tight and/or liquid-tight) in order to protect the one or more storage cells against environmental influences.

The storage module further comprises a degassing line which is arranged on the housing and runs outside the housing. The degassing line can be designed as a (possibly rigid) pipe and/or as a (possibly flexible) hose. In this case, the degassing line is designed to discharge exhaust gases (which can be produced, for example, in the event of a defect in a storage cell) from the interior of the housing to the area surrounding the storage module. Furthermore, the degassing line is designed to (substantially and/or significantly) cool the exhaust gases as they pass through the degassing line.

The (typically relatively hot) exhaust gases can be reliably discharged from the storage module and/or routed away from the storage module owing to the provision of a degassing line which runs outside the housing of the storage module. Cooling the exhaust gases within the degassing line can have the effect that the exhaust gases have a reduced reactivity (in comparison to the interior of the housing) when the exhaust gases come into contact with the ambient air (at the line outlet of the degassing line). In this way, the thermal load on the area surrounding the storage module can be reduced.

The degassing line can be part of at least one structural element of the housing of the storage module. In particular, the degassing line can have a structural task in respect of the structure and/or the stability of housing of the storage module. For example, the degassing line can serve to mount the housing of the storage module (for example on the body of a vehicle) and/or as a crash profile (in addition to the task of cooling the exhaust gases from the storage module). A profile or structural component which forms the degassing line may be connected in a materially bonded manner and/or welded/adhesively bonded in a fluid-tight manner to the rest of the housing of the storage module.

Therefore, the degassing line can, as a structural component, preferably be integrated into the housing. As an alternative or in addition, the degassing line can have a function in respect of operational stability and/or crash resistance of the storage module. In this way, the safety and/or the efficiency of the storage module can be further increased.

The degassing line (outside the housing) can have a length which is greater by a factor F than the diameter or the cross section of the degassing line. In this case, the factor F can be equal to 5 or more, or 10 or more. Cooling of the exhaust gases and therefore a reduction in the thermal load on the area surrounding the storage module can be implemented in a reliable manner owing to the provision of a relatively long degassing line.

The degassing line can have, at the end that is averted from the housing, a line outlet for exhaust gases, the exhaust gases passing from the degassing line to the area surrounding the storage module through the line outlet. The degassing line can be designed in such a way that the exhaust gases at the line outlet are no longer self-igniting upon contact with the ambient air; and/or that the exhaust gases have a temperature of 400° C. or less, or preferably of 200° C. or less, at the line outlet. In this way, the thermal load on the area surrounding the storage module can be reduced in a particularly reliable manner.

As an alternative or in addition, the degassing line can be designed in such a way that the temperature of the exhaust gases decreases by (a total of) 20% or more, or by 50% or more, as they pass through the degassing line which runs outside the housing. In other words, the temperature of the exhaust gases at the line outlet of the degassing line is preferably 20% or more, or 50% or more, lower than the temperature of the exhaust gases in the interior of the housing or as they enter the degassing line. The safety of the storage module can be increased in a particularly reliable manner owing to a degassing line that is designed in this way.

The degassing line can be designed and/or formed in such a way that the line outlet of the degassing line is arranged 20 cm or more, or 50 cm or more, away from the housing of the storage module. In other words, the smallest distance between the line outlet of the degassing line and the housing can be 20 cm or more, or 50 cm or more. In this way, the safety of the storage module can be further increased.

The storage module can comprise a cooling unit which is configured to actively cool the degassing line (for example by means of a heat sink and/or by means of a cooling fluid). A reduction in the temperature of the exhaust gases and therefore an increase in the safety of storage module can be implemented in a particularly reliable manner owing to the use of a cooling unit.

The storage module can have a degassing valve which is designed to suppress the outlet of exhaust gases from the interior of the housing through the degassing line to the area surrounding the storage module when the pressure within the housing is less than a pressure threshold value (for example between 200 mbar and 500 mbar); and/or to allow the outlet of exhaust gases from the interior of the housing through the degassing line to the area surrounding the storage module when the pressure within the housing is greater than the pressure threshold value. The degassing valve can be arranged at the end of the degassing line that faces the housing, at the end of the degassing line that is averted from the housing, or between the ends. Firstly, reliable shielding of the storage module against environmental influences and, secondly, reliable outlet of exhaust gases can be implemented owing to the provision of a degassing valve.

The degassing line can have one or more surface-increasing structures. The one or more surface-increasing structures can be designed to increase the surface of the degassing line that cools the exhaust gases in comparison to the cooling surface of a degassing line which has, as the cooling surface, solely the line wall of the degassing line with a circular or oval or rectangular profile. As an alternative or in addition, the one or more surface-increasing structures can be designed to conduct exhaust gases within the degassing line toward the line wall of the degassing line and/or away from the line wall of the degassing line in order to assist the heat exchange and thus the cooling of the exhaust gases.

The one or more surface-increasing structures can be arranged within the degassing line and/or can be enclosed by the line wall of the degassing line. As an alternative or in addition, the one or more surface-increasing structures can be at least partially grid-like.

Particularly reliable cooling of the exhaust gases and therefore a particularly reliable increase in the safety of the storage module can be implemented owing to the provision of a degassing line having one or more surface-increasing structures.

A further aspect describes a (road) motor vehicle (in particular a passenger car or a truck or a bus or a motorcycle). The vehicle comprises an electric drive motor. Furthermore, the vehicle comprises at least one electrical storage module, described in this document, having a degassing line, wherein the storage module is configured to store electrical energy for operating the drive motor.

In this case, the degassing line can preferably extend from the housing of the storage module to the rear region of the vehicle (in particular to a fender and possibly beyond it) (similarly to the exhaust pipe of an internal combustion engine). The exhaust gases of a storage module can be discharged in a particularly safe manner in this way.

It should be noted that the apparatuses and systems described in this document can be used either on their own or in combination with other apparatuses and systems described in this document. Furthermore, all aspects of the apparatuses and systems described in this document can be combined with one another in many and diverse ways. In particular, the features of the claims can be combined with one another in many and diverse ways.

In the text which follows, the invention is described in more detail with reference to exemplary embodiments.

DETAILED DESCRIPTION OF THE DRAWINGS

Figure 1:
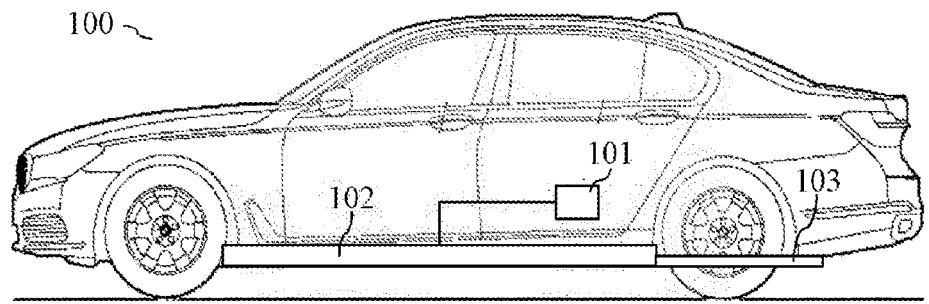
FIG. 1 shows an exemplary vehicle having a storage module.

As explained at the outset, the present document is concerned with increasing the safety of an electrical storage module, in particular during the outlet of exhaust gases. In this context, FIG. 1 shows an exemplary vehicle 100 having an electric drive motor 101. The electric drive motor 101 can be operated using electrical energy from an electrical storage module 102. The electrical storage module 102 can be arranged, for example, on the floor panel of the vehicle 100.

The storage module 102 can have a rated voltage in the high-voltage range (in particular at 300 V or more, or at 500 V or more, or at 700 V or more). The storage module 102 can have a storage capacity of 5 kWh or more, or of 10 kWh or more.

Figure 2A:
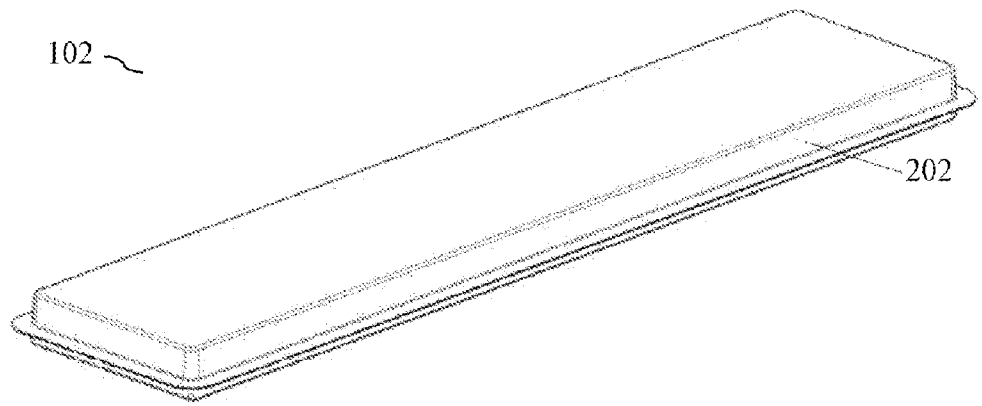
FIG. 2a shows an exemplary storage module.
Figure 2B:
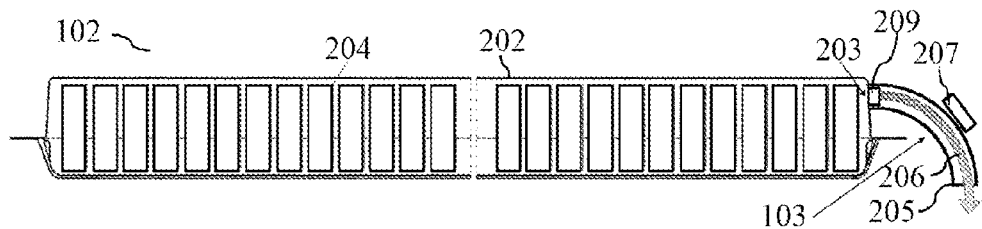
FIG. 2b shows an exemplary storage module having an exhaust gas or degassing line which is routed away from the housing of the storage module.

FIGS. 2a and 2b show an exemplary storage module 102. The storage module 102 typically has a large number of (electrochemical) storage cells 204 which are enclosed by a housing 202 of the storage module 102. The housing 202 is preferably of fluid-tight (in particular liquid-and/or gas-tight) design in order to protect the storage cells 204 against environmental influences. The individual storage cells 204 can be constructed, for example, as prismatic wound cells. The individual storage cells 204 can be connected at least partially in parallel in relation to one another and/or at least partially in series.

During operation of a storage module 102, exhaust gases can develop within the storage module 102, for example as a result of a defect in a storage cell 204. In this case, the exhaust gases can have a relatively high temperature, for example of 300° C. or more, or of 600° C. or more.

The exhaust gases in the housing 202 of the storage module 102 lead to an increase in pressure, as a result of which a degassing opening 203 or a degassing valve 209 on the housing 202 of the storage module 102 can in turn be opened. The storage module 102 has a degassing line 103 which directly adjoins the degassing opening 203. The degassing line 103 can extend away from the housing 202 of the storage module 102. In particular, the degassing line 103 can be designed in such a way that the exhaust gases 206 flowing through the degassing line 103 cool down within the degassing line 103, so that the exhaust gases 206 at the line outlet 205 of the degassing line 103 have a significantly reduced temperature (in comparison to the temperature at the degassing opening 203, that is to say as they enter the degassing line 103).

The degassing line 103 which runs outside the housing 202 can have a length which is greater by the factor 5 or more, 10 or more, 15 or more, or 20 or more, than the diameter or the cross section of the degassing line 103. Therefore, a relatively long degassing line 103 can be provided. This can have the effect that the exhaust gases 206 can be cooled in a reliable manner within the degassing line 103.

The degassing line 103 can be cooled solely by the air in the area surrounding the degassing line 103. In addition, active cooling of the degassing line 103 may be implemented (for example by way of an actively cooled heat sink 207 and/or by way of cooling fluid actively washing around the degassing line 103).

Therefore, a storage module 102 in which the emergency degassing opening 203 is supplemented with a degassing line or with an exhaust gas pipe 103 is described. Here, the degassing line 103 is designed in such a way that, in the event of a thermal reaction within the storage module 102, the exhaust gases 206 have to pass through the degassing line 103 and as a result cool down, before the exhaust gases 206 leave the closed-off housing 202 of the storage module 102 and the degassing line 103 (in which there is an elevated pressure).

A degassing unit or a degassing valve 209 can be arranged at the start or at the end of the degassing line 103, the degassing valve opening when a specific pressure threshold value is reached in the housing 202 of the storage module 102, so that the exhaust gases 206 can pass through the degassing line 103 to the area surrounding the storage module 102.

One or more elements, such as grid structures for example, can be arranged within the degassing line 103 in order to improve the dissipation of heat from the degassing line 103 owing to an increased surface.

The relatively hot exhaust gases 206, which are intended to leave the storage module 102, are cooled on the relatively long journey within the degassing line 103 in such a way that the exhaust gases 206 can no longer (automatically) ignite as they exit at the line outlet 205 of the degassing line 103.

The present invention is not limited to the exemplary embodiments shown. In particular, it should be borne in mind that the description and the figures are intended to illustrate only the principle of the provided apparatuses and systems.

Storage Module Having a Degassing Line

The invention relates to an electrical storage module, in particular for storing electrical energy for driving a motor vehicle.

An at least partially electrically driven vehicle, for example a BEV (Battery Electric Vehicle) or a PHEV (Plug-In Hybrid Electric Vehicle), typically has at least one storage module for storing the electrical energy for operating an electric drive motor of the vehicle. The storage module can have a fluid-tight housing in order to protect the one or more electrochemical storage cells embedded in the storage module against environmental influences.

A storage module having one or more electrochemical storage cells can have a degassing opening through which exhaust gases, which may be produced during operation of the storage module, can exit from the storage module to the area surrounding the storage module. Particularly when there is a defect or a short circuit in a storage cell of the storage module, a thermal reaction can take place in the affected storage cell, the thermal reaction producing the exhaust gases which lead to an increase in pressure in the housing of the storage module. As a result of the increase in pressure, a degassing valve and/or the degassing opening can open, so that relatively hot exhaust gases can escape from the housing of the storage module. The exhaust gases can comprise (in particular flammable) gases, such as CO, $CO_2$, ethene, $H_2$, HF etc. for example.

The present document is concerned with the technical problem of increasing the safety of a storage module when (relatively hot) exhaust gases are exiting from the storage module.

The problem is solved by the independent claim. Advantageous exemplary embodiments are described, inter alia, in the dependent claims. It should be noted that additional features of a patent claim that is dependent on an independent patent claim can, without the features of the independent patent claim or just in combination with a subset of the features of the independent patent claim, form a separate invention that is independent of the combination of all of the features of the independent patent claim and that can be turned into the subject matter of an independent claim, of a divisional application or of a subsequent application. This applies in the same way to technical teachings described in the description that are able to form an invention that is independent of the features of the independent patent claims.

A first aspect describes an (electrical) storage module for storing electrical energy. The storage module can have a rated voltage of 300 V or higher. As an alternative or in addition, the storage module can have a storage capacity of 5 kWh or more. In particular, the storage module can be designed as a high-voltage storage device. For example, the storage module can be designed to store electrical energy for driving a motor vehicle (for example a passenger car, a truck, a bus and/or a motorcycle).

The storage module comprises at least one electrochemical storage cell (for example a lithium ion-based storage cell). The storage cell can be a prismatic wound cell. The storage module typically comprises a large number of (structurally identical) storage cells which are DC-conductively connected to one another at least partially in series and/or at least partially in series, in particular in order to provide a storage module having the abovementioned rated voltage and/or having the abovementioned storage capacity.

Furthermore, the storage module comprises a housing which encloses the electrochemical storage cell. In this case, the housing is of fluid-tight design (in particular gas-tight and/or liquid-tight) in order to protect the one or more storage cells against environmental influences.

The storage module further comprises a degassing line which is arranged on the housing and runs outside the housing. The degassing line can be designed as a (possibly rigid) pipe and/or as a (possibly flexible) hose. In this case, the degassing line is designed to discharge exhaust gases (which can be produced, for example, in the event of a defect in a storage cell) from the interior of the housing to the area surrounding the storage module. Furthermore, the degassing line is designed to (substantially and/or significantly) cool the exhaust gases as they pass through the degassing line.

The (typically relatively hot) exhaust gases can be reliably discharged from the storage module and/or routed away from the storage module owing to the provision of a degassing line which runs outside the housing of the storage module. Cooling the exhaust gases within the degassing line can have the effect that the exhaust gases have a reduced reactivity (in comparison to the interior of the housing) when the exhaust gases come into contact with the ambient air (at the line outlet of the degassing line). In this way, the thermal load on the area surrounding the storage module can be reduced.

The degassing line can be part of at least one structural element of the housing of the storage module. In particular, the degassing line can have a structural task in respect of the structure and/or the stability of housing of the storage module. For example, the degassing line can serve to mount the housing of the storage module (for example on the body of a vehicle) and/or as a crash profile (in addition to the task of cooling the exhaust gases from the storage module). A profile or structural component which forms the degassing line may be connected in a materially bonded manner and/or welded/adhesively bonded in a fluid-tight manner to the rest of the housing of the storage module.

Therefore, the degassing line can, as a structural component, preferably be integrated into the housing. As an alternative or in addition, the degassing line can have a function in respect of operational stability and/or crash resistance of the storage module. In this way, the safety and/or the efficiency of the storage module can be further increased.

The degassing line (outside the housing) can have a length which is greater by a factor F than the diameter or the cross section of the degassing line. In this case, the factor F can be equal to 5 or more, or 10 or more. Cooling of the exhaust gases and therefore a reduction in the thermal load on the area surrounding the storage module can be implemented in a reliable manner owing to the provision of a relatively long degassing line.

The degassing line can have, at the end that is averted from the housing, a line outlet for exhaust gases, the exhaust gases passing from the degassing line to the area surrounding the storage module through the line outlet. The degassing line can be designed in such a way that the exhaust gases at the line outlet are no longer self-igniting upon contact with the ambient air; and/or that the exhaust gases have a temperature of 400° C. or less, or preferably of 200° C. or less, at the line outlet. In this way, the thermal load on the area surrounding the storage module can be reduced in a particularly reliable manner.

As an alternative or in addition, the degassing line can be designed in such a way that the temperature of the exhaust gases decreases by (a total of) 20% or more, or by 50% or more, as they pass through the degassing line which runs outside the housing. In other words, the temperature of the exhaust gases at the line outlet of the degassing line is preferably 20% or more, or 50% or more, lower than the temperature of the exhaust gases in the interior of the housing or as they enter the degassing line. The safety of the storage module can be increased in a particularly reliable manner owing to a degassing line that is designed in this way.

The degassing line can be designed and/or formed in such a way that the line outlet of the degassing line is arranged 20 cm or more, or 50 cm or more, away from the housing of the storage module. In other words, the smallest distance between the line outlet of the degassing line and the housing can be 20 cm or more, or 50 cm or more. In this way, the safety of the storage module can be further increased.

The storage module can comprise a cooling unit which is configured to actively cool the degassing line (for example by means of a heat sink and/or by means of a cooling fluid). A reduction in the temperature of the exhaust gases and therefore an increase in the safety of storage module can be implemented in a particularly reliable manner owing to the use of a cooling unit.

The storage module can have a degassing valve which is designed to suppress the outlet of exhaust gases from the interior of the housing through the degassing line to the area surrounding the storage module when the pressure within the housing is less than a pressure threshold value (for example between 200 mbar and 500 mbar); and/or to allow the outlet of exhaust gases from the interior of the housing through the degassing line to the area surrounding the storage module when the pressure within the housing is greater than the pressure threshold value. The degassing valve can be arranged at the end of the degassing line that faces the housing, at the end of the degassing line that is averted from the housing, or between the ends. Firstly, reliable shielding of the storage module against environmental influences and, secondly, reliable outlet of exhaust gases can be implemented owing to the provision of a degassing valve.

The degassing line can have one or more surface-increasing structures. The one or more surface-increasing structures can be designed to increase the surface of the degassing line that cools the exhaust gases in comparison to the cooling surface of a degassing line which has, as the cooling surface, solely the line wall of the degassing line with a circular or oval or rectangular profile. As an alternative or in addition, the one or more surface-increasing structures can be designed to conduct exhaust gases within the degassing line toward the line wall of the degassing line and/or away from the line wall of the degassing line in order to assist the heat exchange and thus the cooling of the exhaust gases.

The one or more surface-increasing structures can be arranged within the degassing line and/or can be enclosed by the line wall of the degassing line. As an alternative or in addition, the one or more surface-increasing structures can be at least partially grid-like.

Particularly reliable cooling of the exhaust gases and therefore a particularly reliable increase in the safety of the storage module can be implemented owing to the provision of a degassing line having one or more surface-increasing structures.

A further aspect describes a (road) motor vehicle (in particular a passenger car or a truck or a bus or a motorcycle). The vehicle comprises an electric drive motor. Furthermore, the vehicle comprises at least one electrical storage module, described in this document, having a degassing line, wherein the storage module is configured to store electrical energy for operating the drive motor.

In this case, the degassing line can preferably extend from the housing of the storage module to the rear region of the vehicle (in particular to a fender and possibly beyond it) (similarly to the exhaust pipe of an internal combustion engine). The exhaust gases of a storage module can be discharged in a particularly safe manner in this way.

It should be noted that the apparatuses and systems described in this document can be used either on their own or in combination with other apparatuses and systems described in this document. Furthermore, all aspects of the apparatuses and systems described in this document can be combined with one another in many and diverse ways. In particular, the features of the claims can be combined with one another in many and diverse ways.

In the text which follows, the invention is described in more detail with reference to exemplary embodiments. For this, FIG. 1 shows an exemplary vehicle having a storage module;

FIG. 2a shows an exemplary storage module; and

FIG. 2b shows an exemplary storage module having an exhaust gas or degassing line which is routed away from the housing of the storage module.

As explained at the outset, the present document is concerned with increasing the safety of an electrical storage module, in particular during the outlet of exhaust gases. In this context, FIG. 1 shows an exemplary vehicle 100 having an electric drive motor 101. The electric drive motor 101 can be operated using electrical energy from an electrical storage module 102. The electrical storage module 102 can be arranged, for example, on the floor panel of the vehicle 100.

The storage module 102 can have a rated voltage in the high-voltage range (in particular at 300 V or more, or at 500 V or more, or at 700 V or more). The storage module 102 can have a storage capacity of 5 kWh or more, or of 10 kWh or more.

FIGS. 2a and 2b show an exemplary storage module 102. The storage module 102 typically has a large number of (electrochemical) storage cells 204 which are enclosed by a housing 202 of the storage module 102. The housing 202 is preferably of fluid-tight (in particular liquid-and/or gas-tight) design in order to protect the storage cells 204 against environmental influences. The individual storage cells 204 can be constructed, for example, as prismatic wound cells. The individual storage cells 204 can be connected at least partially in parallel in relation to one another and/or at least partially in series.

During operation of a storage module 102, exhaust gases can develop within the storage module 102, for example as a result of a defect in a storage cell 204. In this case, the exhaust gases can have a relatively high temperature, for example of 300° C. or more, or of 600° C. or more.

The exhaust gases in the housing 202 of the storage module 102 lead to an increase in pressure, as a result of which a degassing opening 203 or a degassing valve 209 on the housing 202 of the storage module 102 can in turn be opened. The storage module 102 has a degassing line 103 which directly adjoins the degassing opening 203. The degassing line 103 can extend away from the housing 202 of the storage module 102. In particular, the degassing line 103 can be designed in such a way that the exhaust gases 206 flowing through the degassing line 103 cool down within the degassing line 103, so that the exhaust gases 206 at the line outlet 205 of the degassing line 103 have a significantly reduced temperature (in comparison to the temperature at the degassing opening 203, that is to say as they enter the degassing line 103).

The degassing line 103 which runs outside the housing 202 can have a length which is greater by the factor 5 or more, 10 or more, 15 or more, or 20 or more, than the diameter or the cross section of the degassing line 103. Therefore, a relatively long degassing line 103 can be provided. This can have the effect that the exhaust gases 206 can be cooled in a reliable manner within the degassing line 103.

The degassing line 103 can be cooled solely by the air in the area surrounding the degassing line 103. In addition, active cooling of the degassing line 103 may be implemented (for example by way of an actively cooled heat sink 207 and/or by way of cooling fluid actively washing around the degassing line 103).

Therefore, a storage module 102 in which the emergency degassing opening 203 is supplemented with a degassing line or with an exhaust gas pipe 103 is described. Here, the degassing line 103 is designed in such a way that, in the event of a thermal reaction within the storage module 102, the exhaust gases 206 have to pass through the degassing line 103 and as a result cool down, before the exhaust gases 206 leave the closed-off housing 202 of the storage module 102 and the degassing line 103 (in which there is an elevated pressure).

A degassing unit or a degassing valve 209 can be arranged at the start or at the end of the degassing line 103, the degassing valve opening when a specific pressure threshold value is reached in the housing 202 of the storage module 102, so that the exhaust gases 206 can pass through the degassing line 103 to the area surrounding the storage module 102.

One or more elements, such as grid structures for example, can be arranged within the degassing line 103 in order to improve the dissipation of heat from the degassing line 103 owing to an increased surface.

The relatively hot exhaust gases 206, which are intended to leave the storage module 102, are cooled on the relatively long journey within the degassing line 103 in such a way that the exhaust gases 206 can no longer (automatically) ignite as they exit at the line outlet 205 of the degassing line 103.

The present invention is not limited to the exemplary embodiments shown. In particular, it should be borne in mind that the description and the figures are intended to illustrate only the principle of the proposed apparatuses and systems.

What is claimed is:

1. A vehicle, comprising:
    an electric drive motor; and
    a storage module disposed on a floor panel of the vehicle, wherein the storage module is configured to store electrical energy for operating the electric drive motor;
    wherein the storage module comprises:
        an electrochemical storage cell;
        a housing which encloses the electrochemical storage cell; and
        a degassing line, wherein the degassing line is part of at least one structural element of the housing that mounts the storage module on the floor panel of the vehicle, wherein the degassing line is an exhaust gas pipe that extends from the housing to a point that is external to the vehicle and beyond a fender of the vehicle, and wherein an exhaust gas from an interior of the housing is dischargeable by the degassing line to an area external to the vehicle and is coolable by the degassing line;
        wherein the degassing line is configured such that the exhaust gas is no longer self-ignitable upon contact with ambient air at an outlet of the degassing line such that a thermal load on an area surrounding the storage module is reduceable.

2. The vehicle according to claim 1, wherein the degassing line has a length which runs outside the housing and which is greater by a factor than a diameter of the degassing line and wherein the factor is equal to 5 or more.

3. The vehicle according to claim 1, wherein:
    the housing has a line outlet, wherein the exhaust gas is passable from the interior of the housing through the line outlet to the degassing line; and the degassing line is configured such that the exhaust gas has a temperature of 400° C. or less at the outlet of the degassing line.

4. The vehicle according to claim 1, wherein the degassing line is configured such that a temperature of the exhaust gas decreases by 20% or more as the exhaust gas passes through the degassing line.

5. The vehicle according to claim 1, further comprising a cooling unit which is configured to actively cool the degassing line, wherein the cooling unit is an actively cooled heat sink.

6. The vehicle according to claim 1, wherein the storage module has a degassing valve which is configured to:
- suppress outlet of the exhaust gas from the interior of the housing through the degassing line to the area surrounding the storage module when a pressure within the housing is less than a pressure threshold value; and/or
- allow outlet of the exhaust gas from the interior of the housing through the degassing line to the area surrounding the storage module when the pressure within the housing is greater than the pressure threshold value.

7. The vehicle according to claim 6, wherein the degassing valve is disposed at a first end of the degassing line that faces the housing, at a second end of the degassing line that is averted from the housing, or between the first end and the second end.

8. The vehicle according to claim 1, wherein the degassing line has a surface-increasing structure which:
- increases a surface of the degassing line that cools the exhaust gas; and/or
- conducts the exhaust gas within the degassing line toward a line wall of the degassing line and/or away from the line wall of the degassing line.

9. The vehicle according to claim 8, wherein the surface-increasing structure is disposed within the degassing line and/or is enclosed by the line wall of the degassing line and wherein the surface-increasing structure is at least partially grid-like.

10. The vehicle according to claim 1, wherein:
the storage module has a rated voltage of 300 V or higher; or
the storage module has a storage capacity of 5 kWh or more; or
the storage module is a high-voltage storage device; or
the storage module stores electrical energy for driving a motor vehicle.

* * * * *